United States Patent
Bose et al.

(10) Patent No.: US 10,135,853 B2
(45) Date of Patent: Nov. 20, 2018

(54) MULTI-TIER AGGREGATION FOR COMPLEX EVENT CORRELATION IN STREAMS

(71) Applicant: Northrop Grumman Systems Corporation, Falls Church, VA (US)

(72) Inventors: Brock D. Bose, Alexandria, VA (US); Bhargav R. Avasarala, Arlington, VA (US); Donald D. Steiner, McLean, VA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 242 days.

(21) Appl. No.: 15/270,219

(22) Filed: Sep. 20, 2016

(65) Prior Publication Data

US 2018/0083992 A1    Mar. 22, 2018

(51) Int. Cl.
*G06F 21/00* (2013.01)
*H04L 29/06* (2006.01)

(52) U.S. Cl.
CPC ...... *H04L 63/1425* (2013.01); *H04L 63/1416* (2013.01)

(58) Field of Classification Search
None
See application file for complete search history.

(56) References Cited

U.S. PATENT DOCUMENTS

| | | | |
|---|---|---|---|
| 9,064,210 B1 * | 6/2015 | Hart | G06N 7/005 |
| 9,516,053 B1 * | 12/2016 | Muddu | H04L 63/1425 |
| 2010/0064368 A1 * | 3/2010 | Stolfo | G06F 21/564 |
| | | | 726/24 |
| 2015/0106927 A1 * | 4/2015 | Ferragut | H04L 63/1416 |
| | | | 726/23 |
| 2015/0161394 A1 * | 6/2015 | Ferragut | G06F 21/577 |
| | | | 726/25 |
| 2016/0055190 A1 * | 2/2016 | Bar-Yam | G06F 17/30572 |
| | | | 707/693 |
| 2017/0171235 A1 * | 6/2017 | Mulchandani | H04L 63/1425 |

OTHER PUBLICATIONS

Ari, Ismail, Erdi Olmezogullari, and Omer F. Celebi; "Data Stream Analytics and Mining in the Cloud;" 2012 IEEE 4th International Conference on Cloud Computing (2012): 857-62; Data Stream Analytics and Mining in the Cloud; Web. Jul. 11, 2014.

* cited by examiner

*Primary Examiner* — Shin-Hon (Eric) Chen
(74) *Attorney, Agent, or Firm* — Katten Muchin Rosenman LLP

(57) ABSTRACT

A system and method for detecting anomalous activity, the method includes collecting data from a plurality of data sources, wherein each data source generates a data stream; harmonizing each data stream using a computer processor so that the harmonized data is in a common format; generating behavior models based on the harmonized data using the computer processor; analyzing the harmonized data at a first level using the behavior models and the computer processor to generate meta-events, wherein the meta-events represent anomalous behavior; analyzing the meta-events at a second level using the computer processor to determine if an alert should be issued; and when an alert should be issued, displaying the alert is disclosed.

22 Claims, 8 Drawing Sheets

TO FIG. 6 CONT.

MULTI-TIER AGGREGATION FOR COMPLEX EVENT CORRELATION IN STREAMS

TECHNICAL FIELD

This disclosure is generally related to detecting threats posed by insiders of an organization. More specifically, this disclosure is related to a multi-tier system for detecting complex events using data gathered from a plurality of sensors.

BACKGROUND

Throughout history, it has been well-known that the strongest defenses may be rendered impotent by actions of a malicious insider. The malicious insider may be operating within the parameters of his normal activities and with the freedom to efficiently accomplish those activities. However, this may result in the malicious insider being able to easily bypass elaborate security measures designed to protect against outside threats. In the digital age, the threat posed by the malicious insider has greatly increased.

The total cost of cyber espionage worldwide is estimated to be between $150-$300 billion. In addition to the loss of intellectual property due to cyber espionage, other direct costs, such as costs associated with reconfiguring security features after a data breach, costs associated with investigating the data breach, costs associated with damaged customer relationships, costs associated with providing credit monitoring for affected parties, costs for legal reparations to clients whose information has been compromised, and costs associated with additional regulatory processes may also be incurred. Additionally, there may be indirect costs associated with cyber espionage. Such indirect costs may include reputational damage and additional competition due to compromised technology or business plans.

One current system that may be used to prevent or mitigate cyber espionage is Wave. Wave uses data encryption, automated remote backup, and document tagging to ensure that the malicious insider cannot deface, delete, or exfiltrate sensitive organizational information. One drawback of Wave, however, is that the malicious insider is generally operating within the constraints of his normal organization function. Thus, access to sensitive information is not precluded. Another drawback is that document tagging may be simple to defeat. For example, adding a single extra character to the document may defeat tagging.

Another current system is Raytheon's SureView™. SureView™ enables security personnel to exhaustively review actions taken by a limited number of users. However, these users must be determined before their activity may be monitored. Since malicious incident detection generally occurs approximately 32 months after the malicious incident, predetermining which users to monitor may not be effective in preventing malicious incidents.

Yet another system is Lockheed Martin's Palisade™. Palisade™ identifies malicious behavior by examining network behavior based on an analysis of network configurations and logs. The analysis occurs after the logs have been transmitted to a central repository. Thus, Palisade™ may provide evidence of how a malicious attack occurred but cannot stop a malicious attack from being carried out.

Accordingly, there is a need for a real-time system for detecting anomalous activity and for providing alerts for detected anomalous activities.

SUMMARY

In one aspect of this disclosure, a method for detecting anomalous activity, the method comprising collecting data from a plurality of data sources, wherein each data source generates a data stream; harmonizing each data stream using a computer processor so that the harmonized data is in a common format; generating behavior models based on the harmonized data using the computer processor; analyzing the harmonized data at a first level using the behavior models and the computer processor to generate meta-events, wherein the meta-events represent anomalous behavior; analyzing the meta-events at a second level using the computer processor to determine if an alert should be issued; and when an alert should be issued, displaying the alert is disclosed.

In another aspect of this disclosure, a system for detecting anomalous activity, the system comprising a computer-readable storage medium configured to store computer-executable instructions; a processor configured to execute the computer-executable instructions, the computer-executable instructions comprising collecting data from a plurality of data sources, wherein each data source generates a data stream; harmonizing each data stream using the computer processor so that the harmonized data is in a common format; generating behavior models based on the harmonized data using the computer processor; analyzing the harmonized data at a first level using the behavior models and the computer processor to generate meta-events, wherein the meta-events represent anomalous behavior; and analyzing the meta-events at a second level using the computer processor to determine if an alert should be issued; and a display configured to display the alert is disclosed.

DETAILED DESCRIPTION

Figure 1:
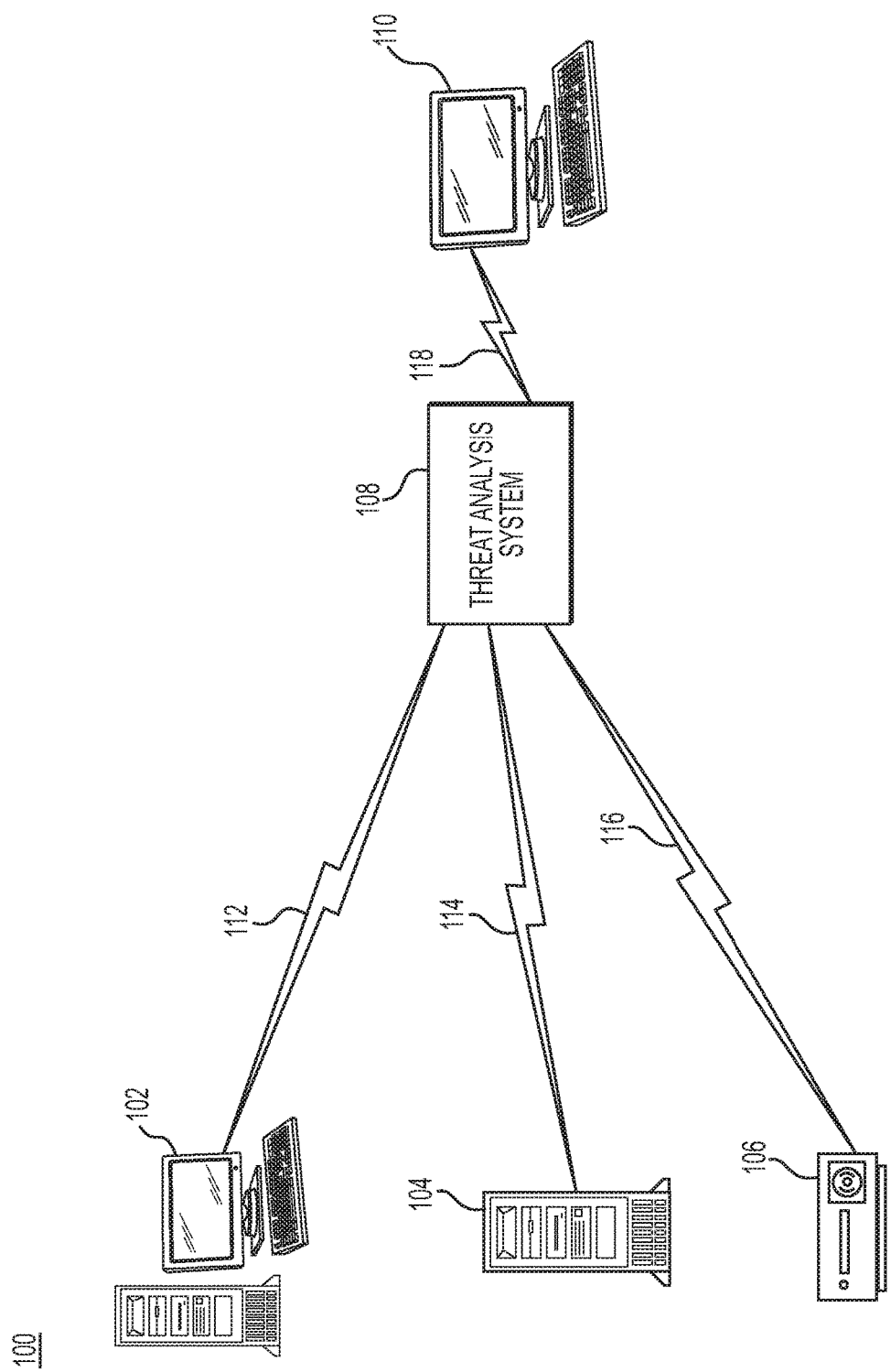
FIG. 1 shows an architecture of the multi-tier system, according to one aspect of this disclosure.

It is to be understood that the figures and descriptions of the present disclosure may have been simplified to illustrate elements that are relevant for a clear understanding of the present disclosure, while eliminating, for purposes of clarity, other elements found in a typical networking system or method. Those of ordinary skill in the art will recognize that other elements may be desirable and/or required in order to implement the present disclosure. However, because such elements are well known in the art, and because they do not facilitate a better understanding of the present disclosure, a discussion of such elements is not provided herein. It is also to be understood that the figures included herewith only provide diagrammatic representations of the presently preferred structures of the present disclosure and that structures falling within the scope of the present disclosure may include structures different than those shown in the drawings.

Broadly, this disclosure is related to a system for analyzing data collected from various information sources to determine when an alert should be issued for suspicious activities. In one aspect of this disclosure, sensors may collect event data regarding activities occurring on or using various equipment, such as personal computers, assets, and resources. The collected event data may then be harmonized. The collected event data may be harmonized by, for example, transforming the collected event data into a common data format. The harmonized event data may then be transmitted to a learning module, which may generate behavioral models based on the harmonized event data. The behavioral models may model expected or normal behavior for a given user. The harmonized event data may also be transmitted to an alert module, which may issue an alert if it determines, based on the harmonized event data and behavioral models, sufficient suspicious activity has occurred to warrant an alert. The alert module may analyze the harmonized event data in two steps. In the first step, the alert module may determine if the harmonized event data do not fit the behavioral models. At the second step, the alert module may determine if the harmonized event data that do not fit the behavioral models, in the aggregate, is sufficiently serious to warrant an alert. If the alert module determines that an alert is warranted, the alert module generates an alert. The system may then display the alert.

FIG. 1 shows an architecture of the multi-tier system 100, according to one aspect of this disclosure. The multi-tier system 100 may include one or more personal computers 102, one or more assets 104, and one or more resources 106. For the purpose of clarity and not limitation, only one personal computer 102, one asset 104, and one resource 106 is disclosed in this description and shown in FIG. 1. One of ordinary skill in the art would readily recognize that any number of personal computers 102, assets 104, and resources 106 may be included in the multi-tier system 100. Examples of personal computers 102 may include laptops, desktop computers, and mobile devices, such as cell phones and tablet computers. Each personal computer 102 may have a user associated with it. Examples of assets 104 may include, for example, server computers, such as mainframes and bladed servers. Examples of resources 106 may include, for example, documents, files, and software applications.

The multi-tier system 100 may also include a threat analysis system 108 and an output terminal 110. The threat analysis system 108 will be described in more detail herein. The output terminal 110 may include, for example, terminals, laptops, desktop computers, and mobile devices, such as cell phones and tablet computers.

The personal computer 102, asset 104, and resource 106 may be in communication with the threat analysis system 108 via a first communication link 112, second communication link 114, and third communication link 116, respectively. The output terminal 110 may be in communication with the threat analysis system 108 via a fourth communication link 118. The communication links 112, 114, 116, 118 may be, for example, an Internet connection, a local area network (LAN) connection, or a wireless local area network (WLAN) connection.

Figure 2:
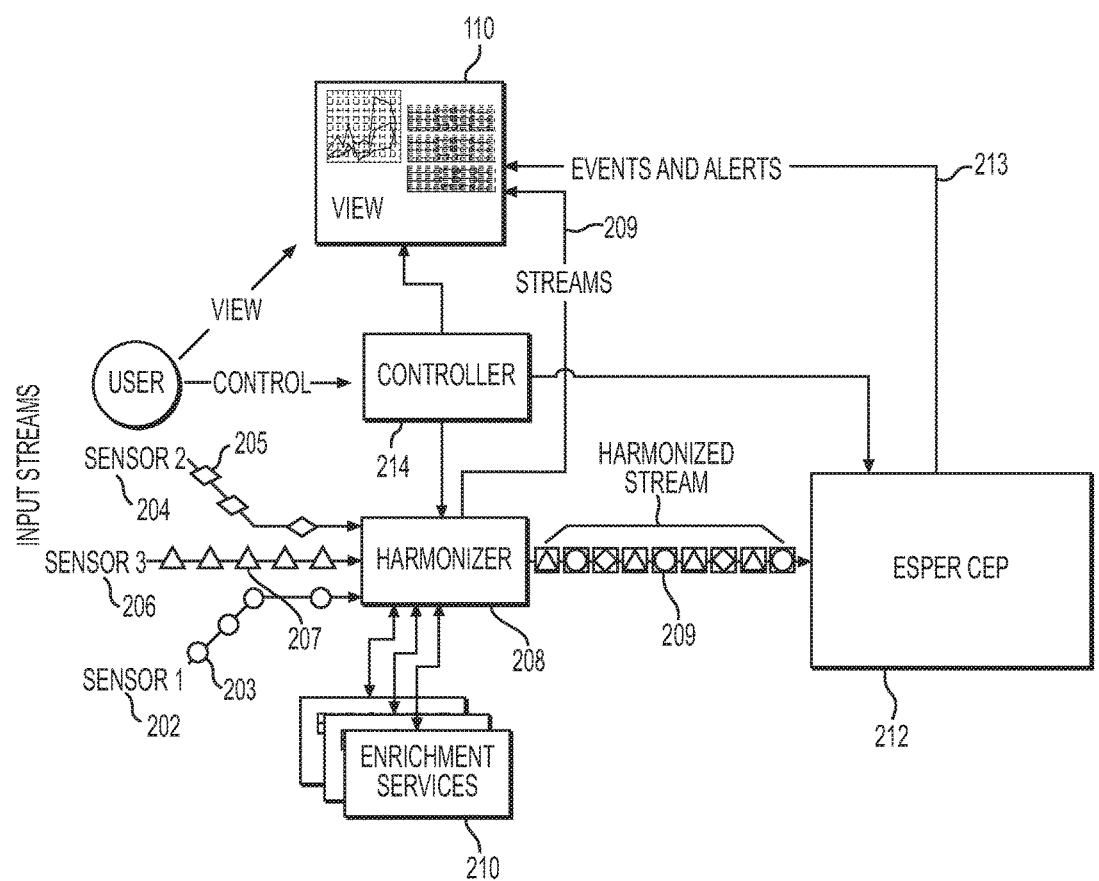
FIG. 2 shows a block diagram of a threat analysis system, according to one aspect of this disclosure.

FIG. 2 shows a block diagram of the threat analysis system 108, according to one aspect of this disclosure. The threat analysis system 108 may include one or more sensors 202, 204, 206. One of ordinary skill in the art would readily recognize that any number of sensors may be used. The sensors 202, 204, 206 may be configured to monitor activity occurring at or using personal computer 102, asset 104, and resource 106, respectively. For example, if a user logged into personal computer 102, sensor 202 may detect this activity and generate a first stream of data 203 indicating that a user logged into personal computer 102. The data stream may include, for example, a timestamp, the username of the user, and the action performed. One of ordinary skill in the art would readily recognize that any activity occurring on personal computer 102 may be detected by sensor 202 and be included in the first data stream 203. The first stream of data 203 may be transmitted to a harmonizer 208. The second sensor 204 and the third sensor 206 may be configured similar to sensor 202 to detect activity occurring on asset 104 and resource 106 and generate a second stream of data 205 and a third stream of data 207. The second and third streams of data 205, 207 may also be transmitted to the harmonizer 208. The data streams 203, 205, 207 may be transmitted via any suitable protocol, such as User Datagram Protocol (UDP).

Examples of sensors 202, 204, 206 include Centrify command data, Guardium database access data, an implementation of an IP-data transfer sensor, and a keystroke and active window logger. For example, Centrify command data may use DirectAudit, which is a commercial off-the-shelf product. DirectAudit may provide auditing of user sessions on computer systems, such as personal computer 102. DirectAudit may also log executed commands along with which privileges, for example, user privileges, and any changes to files or configurations made by the user. Guardium database access may include Guardium Express Activity Monitory for databases, which is a commercial off-the-shelf product provided by IBM. It provides near real-time auditing of database transactions. For each transaction, the generated data stream may contain a timestamp of the request, a database username, a client IP address, and an SQL statement. An IP-data transfer sensor may track inbound and/or outbound IP traffic on a given network connection, such as first, second, and third communication links 112, 114, 116. Events in the data stream may include the IP address of a source and destination of the traffic, a DNS name resolution of an external address, and whether the traffic represents a new IP pair, such as whether the external address has previously exchanged information with the internal address. The keystroke and active window logger may be a utility which records the keystroke data of a user using, for example, personal computer 102. Each keystroke, or event, may be annotated with a timestamp, whether the keystroke was a press or a release, and an identification of a currently active window at the time of the keystroke.

The harmonizer 208 may normalize the streams of data 203, 205, 207, as further described with reference to FIG. 3, below. The harmonizer 208 may normalize the streams of data 203, 205, 207 using, for example, enrichment services 210. The harmonizer 208 may output a cumulative harmonized data stream 209, which may be received as an input to a complex event engine 212. The cumulative harmonized data stream 209 may also be received as an input to a viewer 216, as described in more detail below.

The complex event engine 212 may receive the cumulative harmonized data stream 209 as an input to detect threats and generate alerts. The complex event engine 212 is described in more detail below. Detected threats and generated alerts may be output by the complex event engine 212 and may be received as an input at the viewer 216, as described in more detail below.

The threat analysis system 108 may also include a controller 214. The controller 214 may issues commands or instructions to the harmonizer 208, complex event engine 212, and the output terminal 110. The controller 214 may be, for example, a computer processor.

Figure 3:
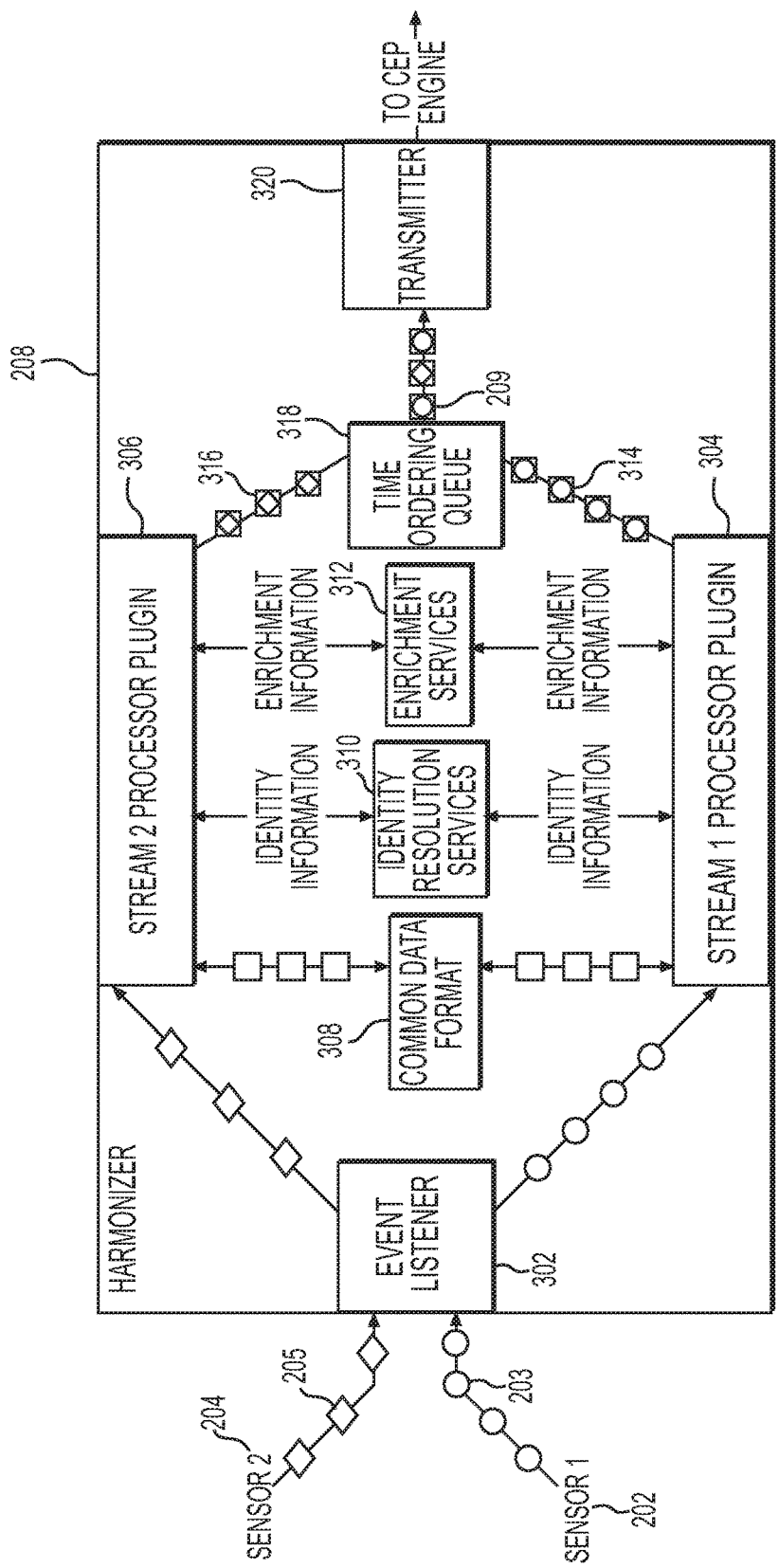
FIG. 3 shows a block diagram of the harmonizer, according to one aspect of this disclosure.

FIG. 3 shows a block diagram of the harmonizer 208, according to one aspect of this disclosure. The harmonizer 208 may transform the data streams 203, 205, 207, provide identity resolution services for events in the data streams 203, 205, 207, and enrich events in the data streams 203, 205, 207. Two data streams 203, 205 generated by the sensors 202, 204, respectively, are input to the harmonizer 208. For purposes of clarity, and not as a limitation, only two streams of data 203, 205 are shown in FIG. 3. The harmonizer 208 may transform the data streams 203, 205 by normalizing the data streams 203, 205 into a common data format. The harmonizer 208 may define the common data format. The common data format may be a mathematical structure, also known as a homomorphism. Homomorphisms may preserve the functionality of operators that process combinations of events. Thus, when the complex event engine 212 receives the events, all of the events may have the same format and thus appear identical in that regards. The uniformity may reduce computation complexity and may facilitate automatic definition and processing of events. The harmonizer 208 may include an event listener 302, which receives the two data streams 203, 205. The event listener 302 processes the two data streams 203, 205 and determines, based on the data, if an event has occurred. The event listener 302 may modify the data streams 203, 205 to indicate events. Examples of events include a keystroke, a user logging into a computer, such as personal computer 102, and copying files.

After the two data streams 203, 205 are processed by the event listener 302, the two data streams 203, 205 may be received as inputs at a first data stream processor plugin 304 and a second data stream processor plugin 306, respectively. The first and second data stream processor plugins 304, 306 may provide any processing needed to transform the data in the data streams 203, 205 into the common data format. The harmonizer 208 may provide various services to the processor plugins 304, 306 to aid in the transformation. For example, the harmonizer 208 may provide identity resolution services via an identity resolution services module 310. The identity resolution services module 310 may resolve any primary identifiers, such as login names, e-mail addresses, media access control (MAC) addresses, etc., into universal identifiers, such as employee IDs, inventory IDs, etc. The universal identifiers may be any identifiers that may be easily recognized and correlated by the complex event engine 212. Another service the harmonizer 208 may provide to the processor plugins 304, 306 is enrichment services via an enrichment services module 312. The enrichment services module 312 may provide any additional metadata associated with the event which may be inconvenient to add at the sensors 202, 204, 206 or transmit from the sensors 202, 204, 206 to the harmonizer 208. For example, there may be bandwidth restrictions which prevent the sensors 202, 204, 206 from transmitting metadata to the harmonizer 208. For example, the enrichment services module 312 may add inventory IDs for devices associated with an employee ID, such as the personal computer 102 of the employee.

Once data in the data streams 203, 205 have been processed by the processor plugins 304, 306, the processed data streams 314, 316 may be received at a time ordering queue 318. The time ordering queue 318 may order the processed data streams 314, 316 in chronological order. This time ordering may be beneficial because the two processed data streams 314, 316 may be from two different sources, such as a personal computer 102 and an asset 104. Time ordering the data from the different sources may aid the complex event engine 212 when correlating events, as described below. The time ordering queue 318 may output the cumulative harmonized data stream 209. The cumulative harmonized data stream 209 may be received as an input at a transmitter 320. The transmitter 320 may be configured to transmit the cumulative harmonized data stream 209 to the complex event engine 212.

Figure 4:
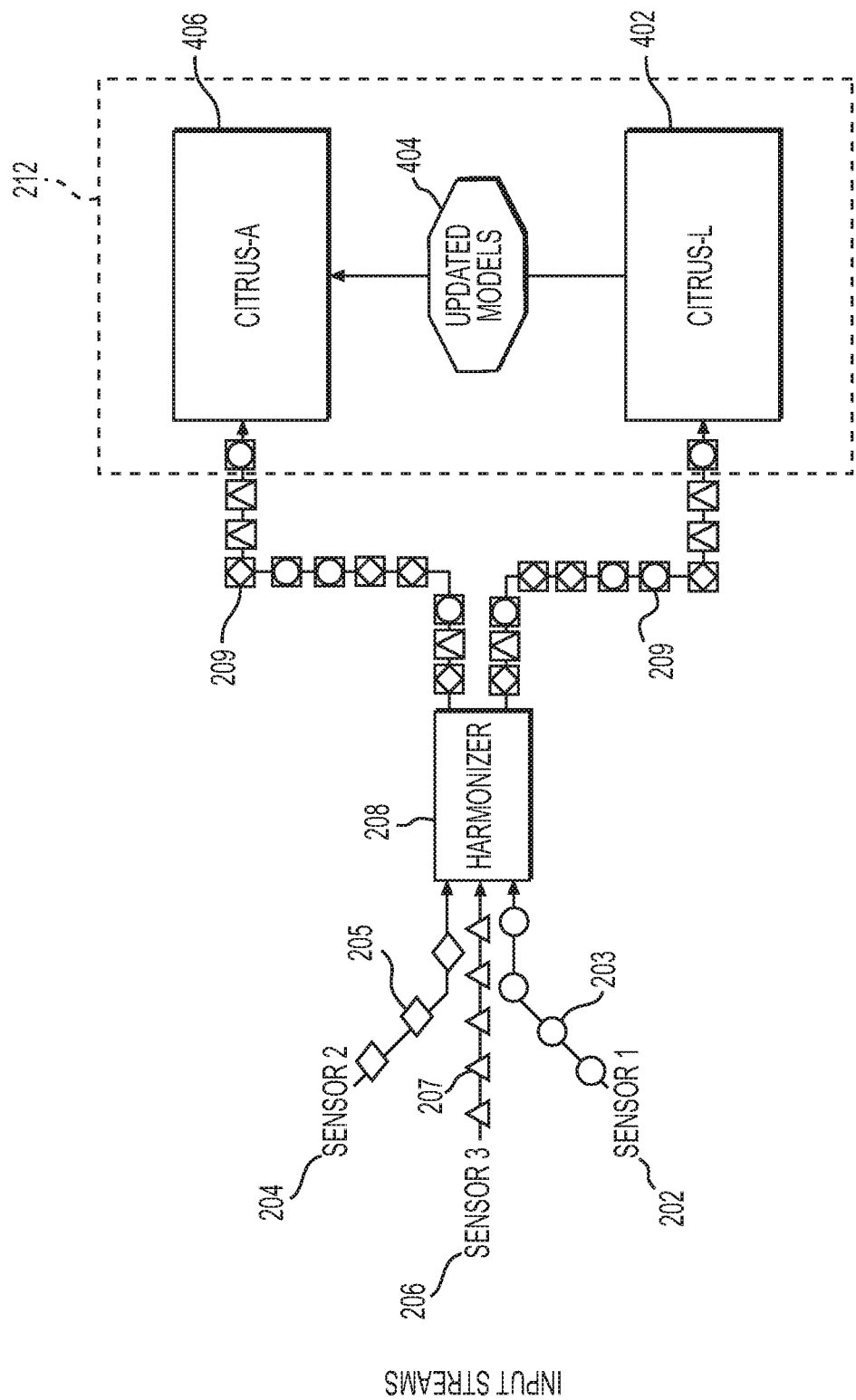
FIG. 4 shows a block diagram of a harmonizer and a complex event engine, according to one aspect of this disclosure.

FIG. 4 shows a block diagram of the harmonizer 208 and the complex event engine 212, according to one aspect of this disclosure. The harmonizer 208 processes the data streams 203, 205, 207 generated by sensors 202, 204, 206 as described above. The harmonizer 208 may transmit the cumulative harmonized data stream 209 to the complex event engine 212 using the transmitter 320. The complex event engine 212 may receive two copies of the cumulative harmonized data stream 209. The two copies of the cumulative harmonized data stream 209 may be received by a learning module 402 and an alert module 406, both of which may be included in the complex event engine 212. Also included in the complex event engine 212 may be behavior models 404. The alert module 406 is described in detail with reference to FIG. 5.

The learning module 402 may analyze the cumulative harmonized data stream 209 to learn patterns of normal behavior, which may be modeled as behavior models 404. The learning module 402 may generate behavior models 404 based on associations between events occurring in the cumulative harmonized data stream 209. The behavior models may be expressed as rules, models, and profiles which characterize a normal operation of the organization or establish patterns of normalcy. For example, rules may be expressed as if-then statements. Additionally, the rules, models, and profiles are not limited to users, such as employees, but they may also cover assets and resources. For example, a rule, model, or profile covering an asset may describe how a server, for example, is typically used, and by whom. As the learning module 402 receives and analyzes more data from the cumulative harmonized data stream 209, the learning module 402 may update the rules, models, and profiles to more accurately characterize the normal operation of the organization. The behavior models 404 may be received as an input to the alert module 406 to assist in determining if, and when, an alert should be issued.

For example, the learning module 402 may generate behavior models 404 by automatically learning entities as name-value pairs. The learning module 402 may convert newly discovered information into knowledge using a two-step inquiry. The first step may be determining whether the learning module 402 has encountered the newly discovered information previously. If the learning module 402 has not encountered the newly discovered information previously, then the learning module 402 may generate a new entity definition. However, if the learning module 402 has encountered the newly discovered information previously, then the learning module 402 may retrieve and update the previously encountered information. The second step may be determining if the newly discovered information is still useful. If the learning module determines that the newly discovered information is still useful, then the learning module may retain the newly discovered information. However, if the learning module 402 determines the newly discovered information is not useful, then the learning module 402 may delete or discard the information.

Figure 5:
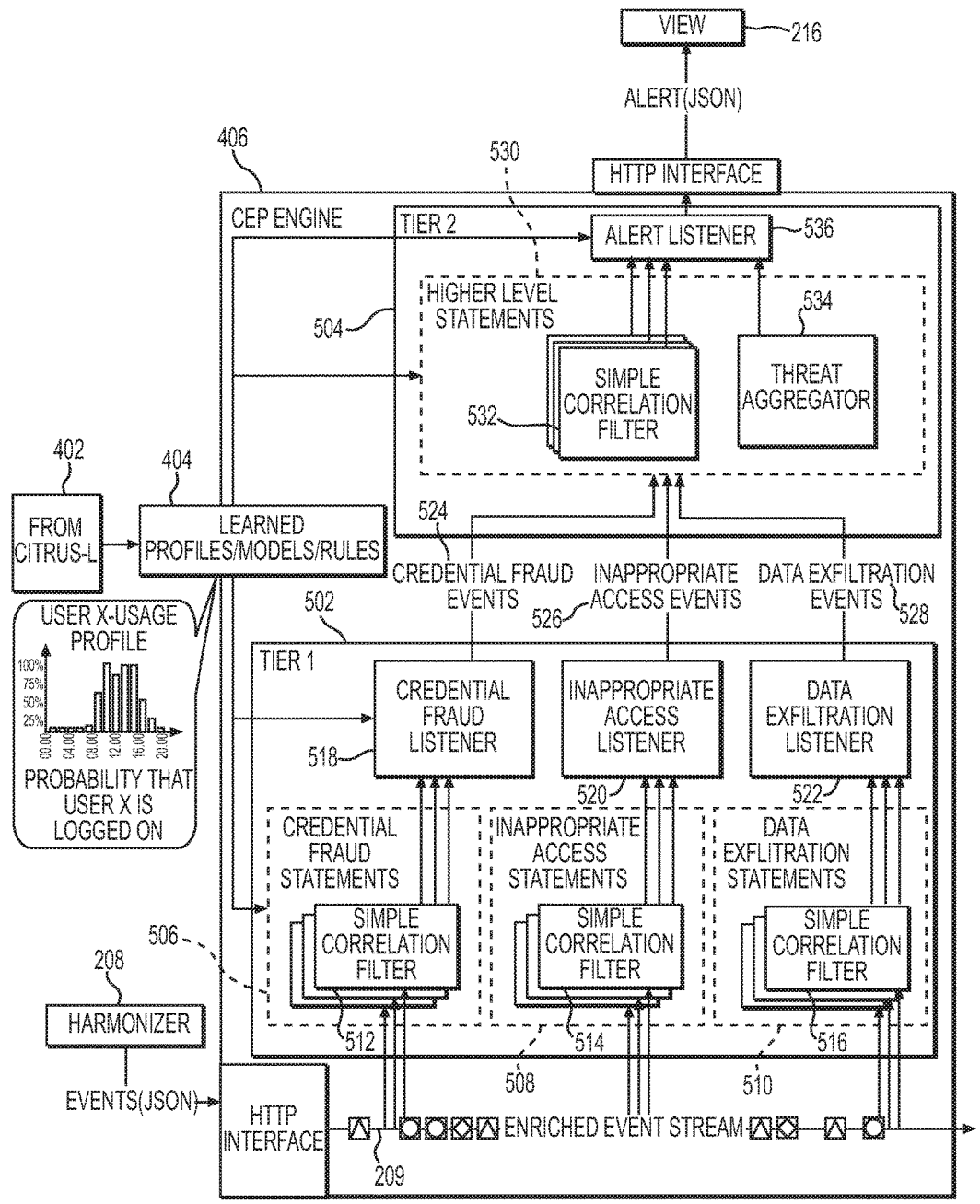
FIG. 5 shows a block diagram of an alert module, according to one aspect of this disclosure.

FIG. 5 shows a block diagram of the alert module 406, according to one aspect of this disclosure. The alert module 406 may include two tiers, tier 1 502 and tier 2 504. One of ordinary skill in the art would readily recognize that any number of tiers may be included in the alert module 406. One advantage of using multiple tiers is that such systems avoid brittle complex event definitions. Additionally, such systems may be tunable to reduce the number of false positives.

The alert module 406 may receive the behavior models 404 generated by the learning module 402, as described above. The alert module 406 may also receive the cumulative harmonized data stream 209 outputted from the harmonizer 208. The alert module 406 may identify abnormalities in the cumulative harmonized data stream 209 using the behavior models 404 generated by the learning module 402.

Tier 1 502 may operate on the cumulative harmonized data stream 209 to identify meta-events that encompass a pre-defined set of anomalous activities. The pre-defined set of anomalous activities may be defined by, for example, the complex event engine 212. More specifically, the pre-defined set of anomalous activities may be based on, for example, the learning module 402. For example, within tier 1 502 may be included a credential fraud module 506, an inappropriate access module 508, and a data exfiltration module 510. One of ordinary skill in the art would readily recognize that other anomalous activity modules may also be included within tier 1 502. The credential fraud module 506 may include one or more credential fraud simple correlation filters 512, the inappropriate access module 508 may include one or more inappropriate access simple correlation filters 514, and the data exfiltration module 510 may include one or more data exfiltration simple correlation filters 516. The credential fraud module 506, the inappropriate access module 508, and the data exfiltration module 510 may receive as an input the cumulative harmonized data stream 209. The credential fraud module 506 may process the cumulative harmonized data stream 209 using the one or more credential fraud simple correlation filters 512. The inappropriate access module 508 may process the cumulative harmonized data stream 209 using the one or more inappropriate access simple correlation filters 514 and the data exfiltration module 510 may process the cumulative harmonized data stream 209 using the one or more data exfiltration simple correlation filters 516 in a similar manner.

The simple correlation filters 512, 514, 516 may receive as an input the cumulative harmonized data stream 209. The simple correlation filters 512, 514, 516 may analyze data in the cumulative harmonized data stream 209 with the behavior models 404 generated by the learning module 402. When data in the cumulative harmonized data stream 209 is within the behavior modeled by the behavior models 404, the data is filtered out. However, when data in the cumulative harmonized data stream 209 is outside the behavior modeled by the behavior models 404, the data is passed on to an appropriate listener, such as listeners 518, 520, 522.

For example, the credential fraud simple correlation filters 512 may process the cumulative harmonized data stream 209. The credential fraud simple correlation filters 512 may apply a set of rules. The rules applied may be based on the behavior models 404 generated by the learning module 402. Therefore, the applied rules may be customized based on, for example, the personal computer 102, asset 104, and resource 106. Each of the applied rules may represent a model derived to detect a certain type of generalized meta-event. In the context of the credential fraud simple correlation filters 512, the rules may detect a credit fraud meta-event. For example, the one or more credential fraud simple correlation filters 512 may tag or flag events related to potential credential fraud in the cumulative harmonized data stream 209 that deviate from the behavior models 404 as a meta-event. The inappropriate access simple correlation filters 514 and the data exfiltration simple correlation filters 516 may, similar to the credential fraud simple correlation filters 512, apply rules to detect an inappropriate access meta-event and a data exfiltration meta-event. The credential fraud simple correlation filters 512 may output the credit fraud meta-events to a credential fraud listener 518. The various listeners 518, 520, 522 may receive as an input the data that was not filtered out by the corresponding correlation filters, such as correlation filters 512, 514, 516, respectively. For example, credential fraud listener 518 may receive as an input all data outside the behavior modeled by the behavior model 404, which is output by the credential fraud simple correlation filter 512. The credential fraud listener 518 may analyze this data to determine if a credential fraud event 524 should be generated. The inappropriate access simple correlation filters 512 and the data exfiltration simple correlation filters 516 may also output the inappropriate access meta-events and the data exfiltration meta-events to an inappropriate access listener 520 and a data exfiltration listener 522.

The credential fraud listener 518, inappropriate access listener 520, and the data exfiltration listener 522 may process the meta-events each listener 518, 520, 522 received. The listeners 518, 520, 522 may output a data stream to tier 2 504. For example, the credential fraud listener 518 may output credential fraud events 524, the inappropriate access listener 520 may output inappropriate access events 526, and the data exfiltration listener 522 may output data exfiltration events 528.

Tier 2 504 operates on the meta-events generated by tier 1 502. Tier 2 504 may operate at a higher level of abstraction than tier 1 502. For example, the rules in tier 2 504 may focus on which types of anomalous activities should result in an alert rather than the particular actions taken by particular individuals within the organization that generated the meta-events. Tier 2 504 may include a higher level statement module 530. The higher level statement module 530 may include one or more higher level simple correlation filters 532 and a threat aggregator 534. The higher level simple correlation filters 532 may operate similarly to the simple correlation filters 512, 514, 516 in tier 1 502. For example, the higher level simple correlation filters 532 may receive as an input the credential fraud events 524, the inappropriate access events 526, and the data exfiltration events 528. The higher level simple correlation filters 532 may process the credential fraud events 524, the inappropriate access events 526, and the data exfiltration events 528 to identify a sequence of events 524, 526, 528 that warrant an alert. Thus, in contrast to the simple correlation filters 512, 514, 516 in tier 1 502, the simple correlation filters 532 in tier 2 504 analyze events from a range of different types of anomalous activities. For example, several less serious meta-events may be identified in tier 1 502. However, when the several less serious meta-events are correlated for different threats and across time, tier 2 may determine that a serious threat is posed. Any warranted alerts may be output by the higher level statement module 530 to an alert listener 536. The alert listener 536 may output any alerts to the viewer 216.

Figure 6:
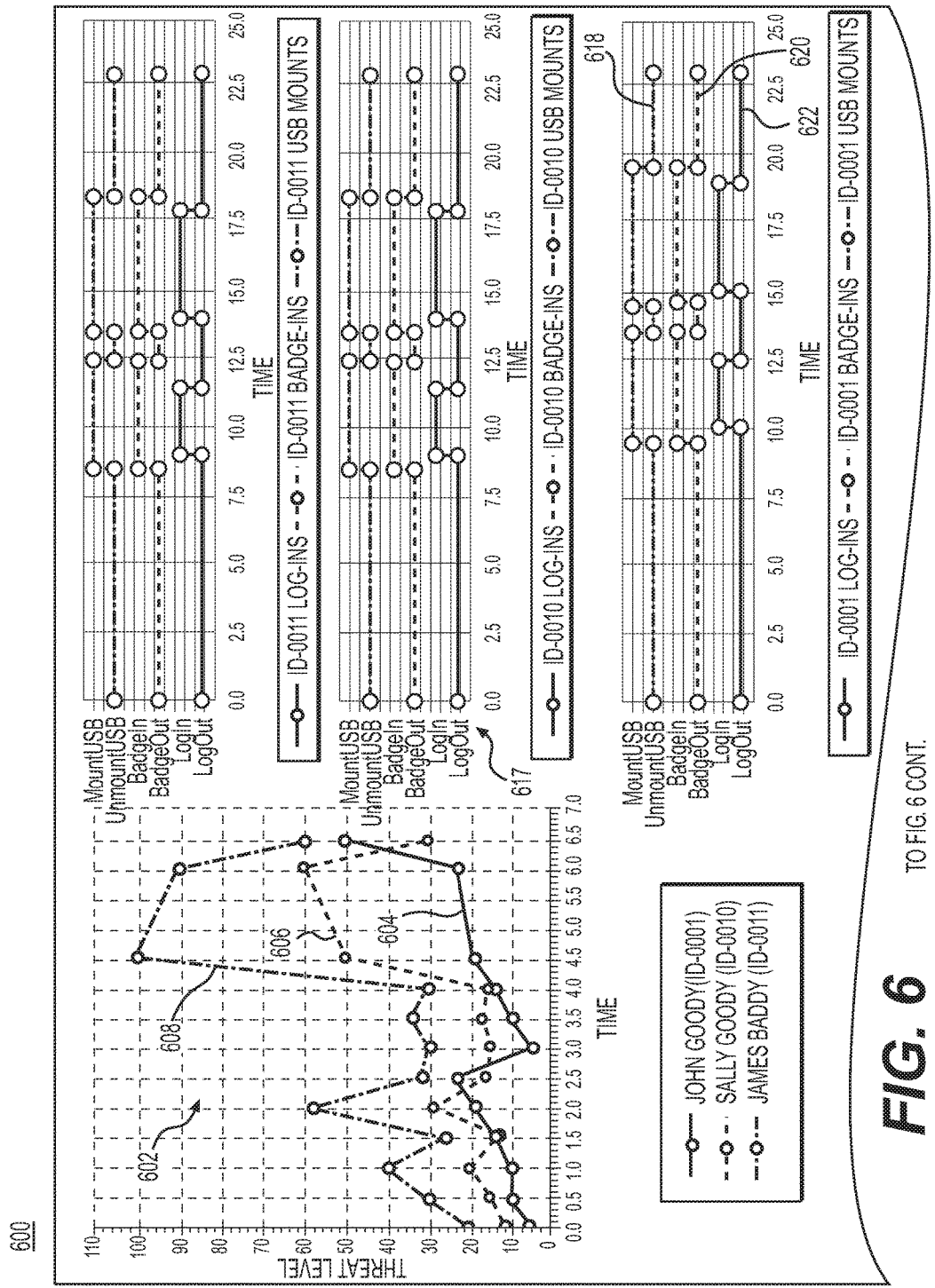
FIG. 6 shows a graphical user interface (GUI) displayed at an output terminal, according to one aspect of this disclosure.
Figure 6:
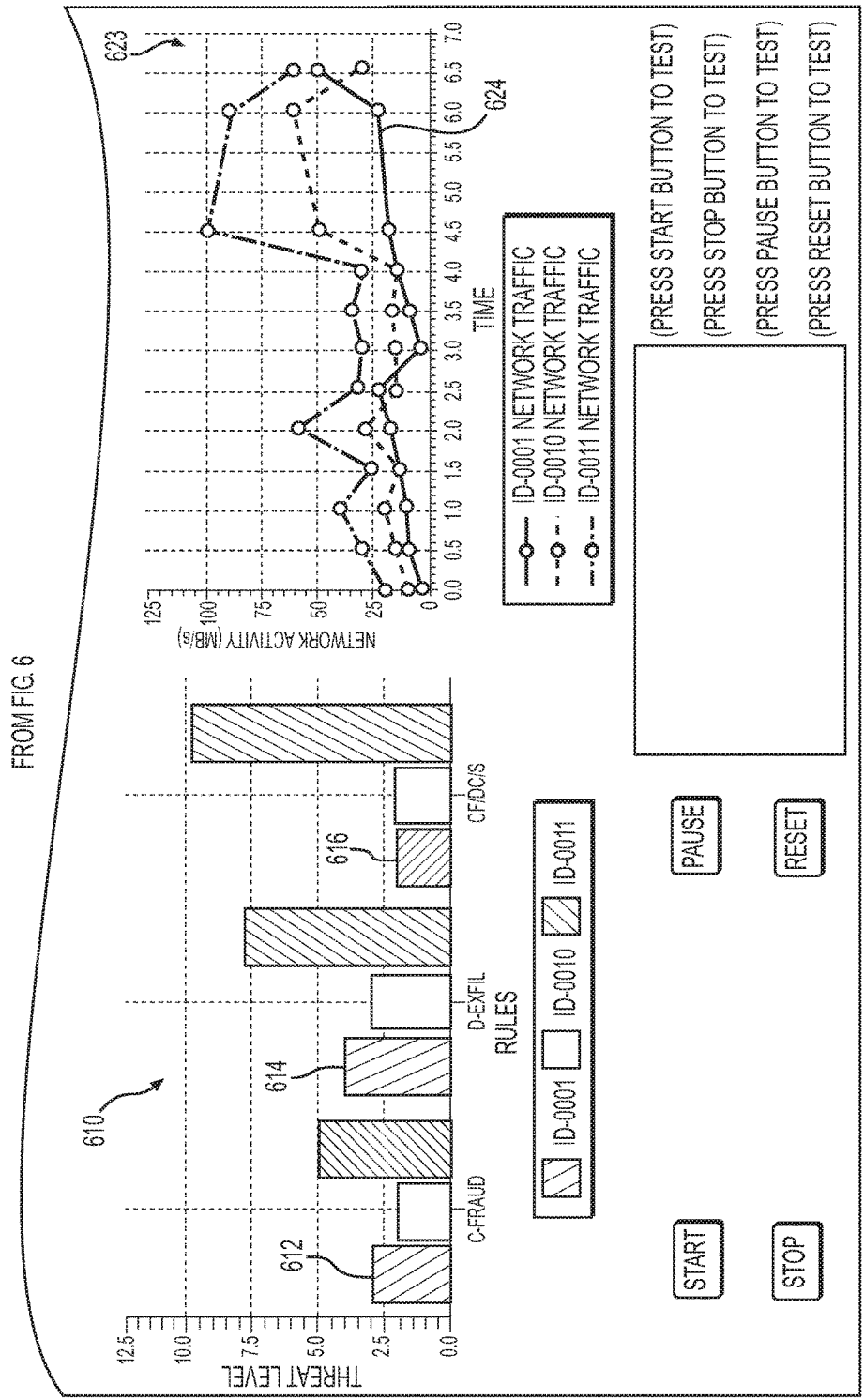

FIG. 6 shows a graphical user interface (GUI) 600 displayed at an output terminal 110, according to one aspect of this disclosure. The GUI 600 may include a threat level line graph 602, a rule violations per user bar graph 610, a user events timeline 617, and a network activity graph 623. The threat level line graph 602 may show a threat level for one or more users over time. For example, threat level line graph 602 shows the threat levels 604, 606, 608 for three users. The threat level may be graphed as a function of time. The threat levels 604, 606, 608 may be determined by the complex event engine 212, as described above. The threat level may increase or decrease based on, for example, the behavior models 404 generated by the learning module 402, the cumulative harmonized data stream 209, and the alert module 406.

The GUI 600 may also include the rule violations per user bar graph 610. The rule violations per user bar graph 610 shows the threat level for one or more users over various threats. For example, the rule violations per user bar graph 610 shows the threat level for one user against credential fraud 612, the threat level for the user against data exfiltration 614, and the threat level for the user against credential fraud, data exfiltration, and badge-out 616. The threat level shown in threat level line graph 602 may be further explained in bar graph 610. For example, the first user threat level line graph 604 may be based on a composite of various threat levels. The various threat levels may relate to, for example, the threat level of the first user regarding credential fraud 612, the threat level of the first user against data exfiltration 614, and the threat level for the first user against credential fraud, data exfiltration, and badge-out 616. One of ordinary skill in the art would readily recognize that the first user threat level line graph 604 may be based on any other suitable criteria as determined by the organization.

The GUI 600 may also include the user events timeline 617. The user events timeline 617 may show activities associated with a user shown over time. For example, one user events timeline may show when a user has mounted and unmounted a USB drive 618, when the user has badged in and badged out 620 from a certain area, and when the user has logged in and logged out 622 of, for example, the personal computer 102. The data displayed in the user events timeline 617 may be the output of one or more sensors 202, 204, 206.

The GUI 600 may also include the network activity graph 623. The network activity graph 623 may show the amount of network activity for a given user over time. Network activity may be measured by, for example, the number of megabits transmitted per second. As an example, network activity graph 623 shows network activity line 624 associated with one user. The data displayed in the network activity graph 623 may be the output of one or more sensors 202, 204, 206.

The GUI 600 may also include complex event engine alerts 626. The GUI 600 may also include sensor data 608.

Figure 7:
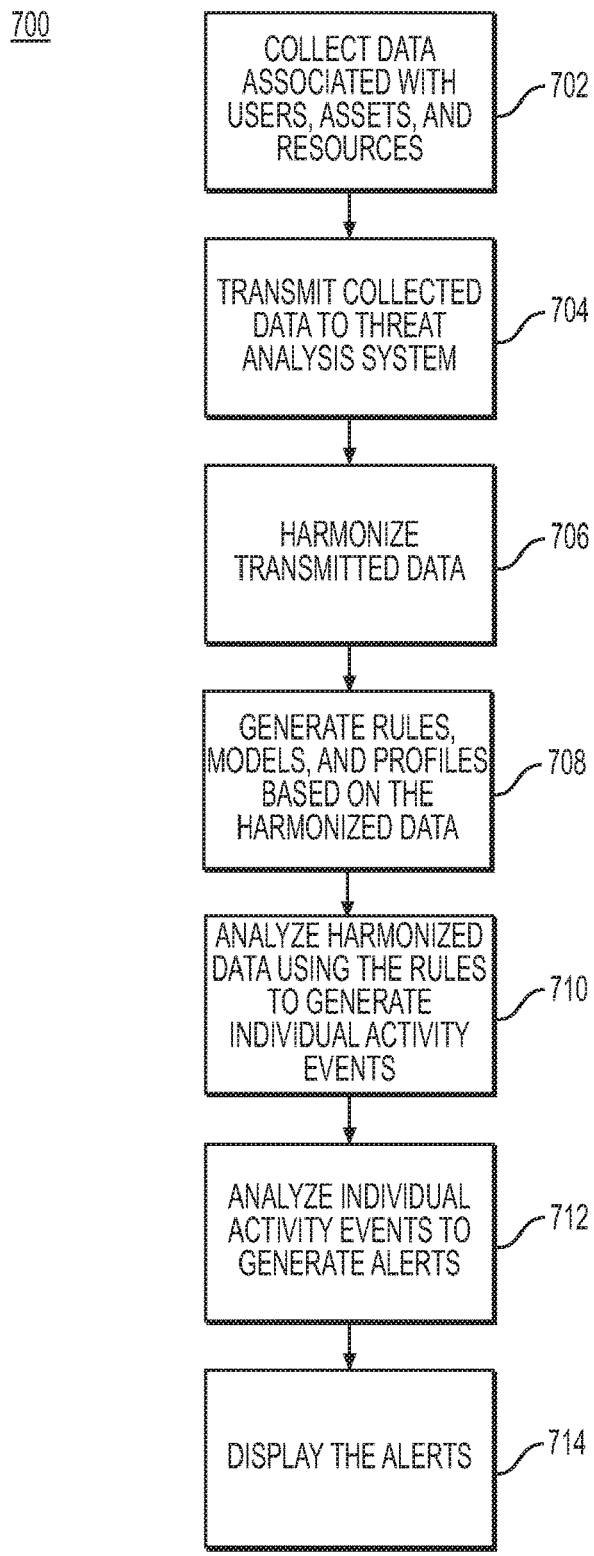
FIG. 7 is a flowchart illustrating a method for operating the multi-tier system, according to one aspect of this disclosure.

FIG. 7 is a flowchart illustrating a method 700 for operating the multi-tier system, according to one aspect of this disclosure. The method 700 may begin at block 702. At block 702, data associated with activities performed by users, assets, and/or resources may be collected. Such data may be collected by sensors 202, 204, 206. The sensors 202, 204, 206 may collect data from, for example, the personal computer 102, assets 104, and resources 106. After block 702 is complete, the method 700 may proceed to block 704.

At block 704, the collected data may be transmitted to the threat analysis system 108. The data transmission may occur using the first, second, and/or third communication links 112, 114, 116. After block 704 is complete, the method 700 may proceed to block 706.

At block 706, the collected data may be harmonized. For example, the collected data may be harmonized using the harmonizer 208. Harmonizing the collected data may mean transforming the collected data into a standard data format. Harmonizing may be accomplished, for example, in the manner described above. After block 706 is complete, the method 700 may proceed to block 708.

At block 708, the behavior models 404, which may include rules, models, and profiles, may be generated based on the harmonized data. The behavior models 404 may be generated as described above. After block 708 is complete, the method 700 may proceed to block 710.

At block 710, the threat analysis system 108 may analyze the harmonized data using the behavior models 404 generated in block 708 as described above. This analysis may result in the threat analysis system 108 generating individual activity events. After block 710 is complete, the method 700 may proceed to block 712.

At block 712, the threat analysis system 108 may analyze the generated individual activity events to determine if an alert is warranted. If the threat analysis system 108 determines that an alert is warranted, the threat analysis system 108 may generate one or more alerts. After block 712 is complete, the method 700 may proceed to block 714.

At block 714, the multi-tier system may display the alerts generated in block 712.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A method for detecting anomalous activity, the method comprising:
    collecting data from a plurality of data sources, wherein each data source generates a data stream;
    harmonizing each data stream using a computer processor so that the harmonized data is in a common format;
    generating behavior models based on the harmonized data using the computer processor;
    analyzing the harmonized data at a first level using the behavior models and the computer processor to identify meta-events, wherein the meta-events represent anomalous behavior and analyzing the harmonized data at the first level identifies a meta-event based on a pre-defined set of anomalous activities;
    analyzing the meta-events at a second level using the computer processor to determine if an alert should be issued, wherein:
        the second level is a higher level of operation than the first level and encompasses the meta-events identified by analyzing the harmonized data at the first level, and
        analyzing the meta-events at the second level includes determining whether an alert should be issued based on multiple meta-events; and
    when an alert should be issued, displaying the alert.

2. The method of claim 1, wherein the harmonizing utilizes enrichment services.

3. The method of claim 2, wherein the enrichment services comprise:

providing identity resolution services for events in each data stream; and enriching events in each data stream.

4. The method of claim 3, wherein enriching further comprises providing metadata associated with an event in each data stream.

5. The method of claim 1, wherein the common format is a homomorphism.

6. The method of claim 1, further comprising:

time ordering the harmonized data to generate a cumulative harmonized data stream.

7. The method of claim 1, wherein the behavior models are generated based on associations between events in the harmonized data.

8. The method of claim 1, wherein the behavioral models comprise a set of rules, models, and profiles which establish patterns of normalcy of an organization.

9. The method of claim 1, wherein the behavior models are modified based on newly collected data.

10. The method of claim 1, further comprising:

defining a set of anomalous activities using a complex event engine.

11. The method of claim 1, further comprising:

analyzing the meta-events at a third or higher level using the computer processor to determine if an alert should be issued.

12. A system for detecting anomalous activity, the system comprising:

a computer-readable storage device configured to store computer-executable instructions;

a hardware computer processor configured to execute the computer-executable instructions, the computer-executable instructions comprising:

collecting data from a plurality of data sources, wherein each data source generates a data stream;

harmonizing each data stream using the computer processor so that the harmonized data is in a common format;

generating behavior models based on the harmonized data using the computer processor;

analyzing the harmonized data at a first level using the behavior models and the computer processor to identify meta-events, wherein the meta-events represent anomalous behavior and analyzing the harmonized data at the first level identifies a meta-event based on a pre-defined set of anomalous activities;

analyzing the meta-events at a second level using the computer processor to determine if an alert should be issued, wherein:

the second level is a higher level of operation than the first level and encompasses the meta-events identified by analyzing the harmonized data at the first level, and analyzing the meta-events at the second level includes determining whether an alert should be issued based on multiple meta-events; and a display configured to display the alert.

13. The system of claim 12, wherein the harmonizing utilizes enrichment services.

14. The system of claim 13, wherein the enrichment services comprise:

providing identity resolution services for events in each data stream; and enriching events in each data stream.

15. The system of claim 14, wherein enriching further comprises providing metadata associated with an event in each data stream.

16. The system of claim 12, wherein the common format is a homomorphism.

17. The system of claim 12, wherein the computer-executable instructions further comprise:

time ordering the harmonized data to generate a cumulative harmonized data stream.

18. The system of claim 12, wherein the behavior models are generated based on associations between events in the harmonized data.

19. The system of claim 12, wherein the behavioral models comprise a set of rules, models, and profiles which establish patterns of normalcy of an organization.

20. The system of claim 12, wherein the behavior models are modified based on newly collected data.

21. The system of claim 12, wherein the computer-executable instructions further comprise:

defining a set of anomalous activities using a complex event engine.

22. The system of claim 12, wherein the computer-executable instructions further comprise:

analyzing the meta-events at a third or higher level using the computer processor to determine if an alert should be issued.

* * * * *